(12) United States Patent
Ramsey et al.

(10) Patent No.: US 12,120,980 B1
(45) Date of Patent: Oct. 22, 2024

(54) FRUIT PICKER

(71) Applicants: Mark C. Ramsey, Omaha, NE (US); Robert A. Foster, Omaha, NE (US)

(72) Inventors: Mark C. Ramsey, Omaha, NE (US); Robert A. Foster, Omaha, NE (US)

( * ) Notice: Subject to any disclaimer, the term of this patent is extended or adjusted under 35 U.S.C. 154(b) by 271 days.

(21) Appl. No.: 17/947,748

(22) Filed: Sep. 19, 2022

Related U.S. Application Data

(63) Continuation of application No. 16/677,062, filed on Nov. 7, 2019, now abandoned.

(51) Int. Cl.
*A01D 46/247* (2006.01)
*A01D 46/22* (2006.01)

(52) U.S. Cl.
CPC .......... *A01D 46/247* (2013.01); *A01D 46/22* (2013.01)

(58) Field of Classification Search
CPC .................................................. A01D 46/247
See application file for complete search history.

(56) References Cited

U.S. PATENT DOCUMENTS

| | | | |
|---|---|---|---|
| 1,691,858 A * | 11/1928 | Ryerson | A47L 19/04 220/487 |
| 2,113,518 A | 4/1938 | Ruppee | |
| 2,697,628 A * | 12/1954 | Burke | B65D 71/50 294/87.26 |
| 2,812,875 A | 11/1957 | Buzicky et al. | |
| 3,113,690 A | 12/1963 | Swenck | |
| 3,323,297 A | 6/1967 | Conradt | |
| 3,432,039 A | 3/1969 | Howitt | |
| 3,855,765 A | 12/1974 | Forkner et al. | |
| 4,265,079 A | 5/1981 | Hoffmann | |
| 4,287,840 A | 9/1981 | Weidner | |
| 4,350,005 A | 9/1982 | Tran | |
| 4,835,955 A | 6/1989 | Gaubis | |
| 5,593,743 A * | 1/1997 | Baker | A47G 33/04 428/131 |
| 5,724,799 A | 3/1998 | Hsia | |
| 6,892,895 B2 | 5/2005 | Zhu et al. | |
| 2011/0220032 A1 | 9/2011 | Pendergrast et al. | |
| 2012/0255271 A1 | 10/2012 | Madani | |
| 2017/0320663 A1 | 11/2017 | Cautereels et al. | |

FOREIGN PATENT DOCUMENTS

WO    WO-2019242869 A1 * 12/2019 ........... A01D 46/247

OTHER PUBLICATIONS

STIC EIC search notes (Year: 2021).

* cited by examiner

*Primary Examiner* — Alicia Torres
(74) *Attorney, Agent, or Firm* — Suiter Swantz IP

(57) ABSTRACT

A two-piece fruit picker which includes a first basket portion and a second basket portion. The first and second basket portions may be selectively connected together to form the fruit picker. The second basket portion may be positioned in the first basket portion in a nested relationship for shipment, storage, transportation, or retailing purposes.

2 Claims, 6 Drawing Sheets

FRUIT PICKER

CROSS REFERENCE TO RELATED APPLICATIONS

The present application claims the benefit under 35 U.S.C. § 120 of U.S. patent application Ser. No. 16/677,062 filed Nov. 7, 2019. The U.S. patent application Ser. No. 16/677,062 filed Nov. 7, 2019 is hereby incorporated by reference in its entirety.

BACKGROUND OF THE INVENTION

Field of the Invention

This invention relates to a hand-held fruit picker device and more particularly relates to a hand-held fruit picker device which is comprised of a two-piece fruit picker device which may be easily and quickly disassembled so that the two-pieces of the device may be nested together to provide a product which is smaller for shipment, storage, retailing, transportation, etc.

Description of the Related Art

Hand-held fruit pickers have been successfully marketed and used for several years. For example, see U.S. Pat. Nos. 3,323,297 and 5,724,799. A vast majority of the prior art fruit pickers have included a hollow picker basket attached to an elongated handle or pole. Although the prior art fruit pickers have met with considerable success, the hollow baskets thereof occupy considerable space which makes shipment thereof difficult since the shipping containers can only have a limited number of fruit pickers therein due to the space occupied by each fruit picker.

To the best of Applicant's knowledge, the prior art fruit pickers of the basket type cannot be disassembled for shipment.

SUMMARY OF THE INVENTION

This Summary is provided to introduce a selection of concepts in a simplified form that are further described below in the Detailed Description. This Summary is not intended to identify key aspects or essential aspects of the claimed subject matter. Moreover, this Summary is not intended for use as an aid in determining the scope of the claimed subject matter.

A two-piece fruit picker which includes a first basket portion and a second basket portion. The first and second basket portions may be selectively connected together to form a fruit picker for picking fruit such as oranges, peaches, apples, etc. The first and second basket portions may be selectively secured together in a nesting manner so that they occupy less space than prior art fruit pickers for shipment purposes, storage, transporting, and retailing.

A principal object of the invention is to provide a two-piece fruit picker which may be assembled for use and disassembled for shipment purposes, storage, transporting and retailing.

Yet another object of the invention is to provide a fruit picker which is comprised of first and second basket portions which may be assembled for use and which may be disassembled and nested together for shipment thereby lowering shipment costs of the fruit pickers.

Still another object of the invention is to provide a fruit picker which is economical of manufacture and durable in use.

These and other objects will be apparent to those skilled in the art.

BRIEF DESCRIPTION OF THE DRAWINGS

Non-limiting and non-exhaustive embodiments of the present invention are described with reference to the following figures, wherein like reference numerals refer to like parts throughout the various views unless otherwise specified.

DESCRIPTION OF THE PREFERRED EMBODIMENT

Embodiments are described more fully below with reference to the accompanying figures, which form a part hereof and show, by way of illustration, specific exemplary embodiments. These embodiments are disclosed in sufficient detail to enable those skilled in the art to practice the invention. However, embodiments may be implemented in many different forms and should not be construed as being limited to the embodiments set forth herein. The following detailed description is, therefore, not to be taken in a limiting sense in that the scope of the present invention is defined only by the appended claims.

Figure 1:
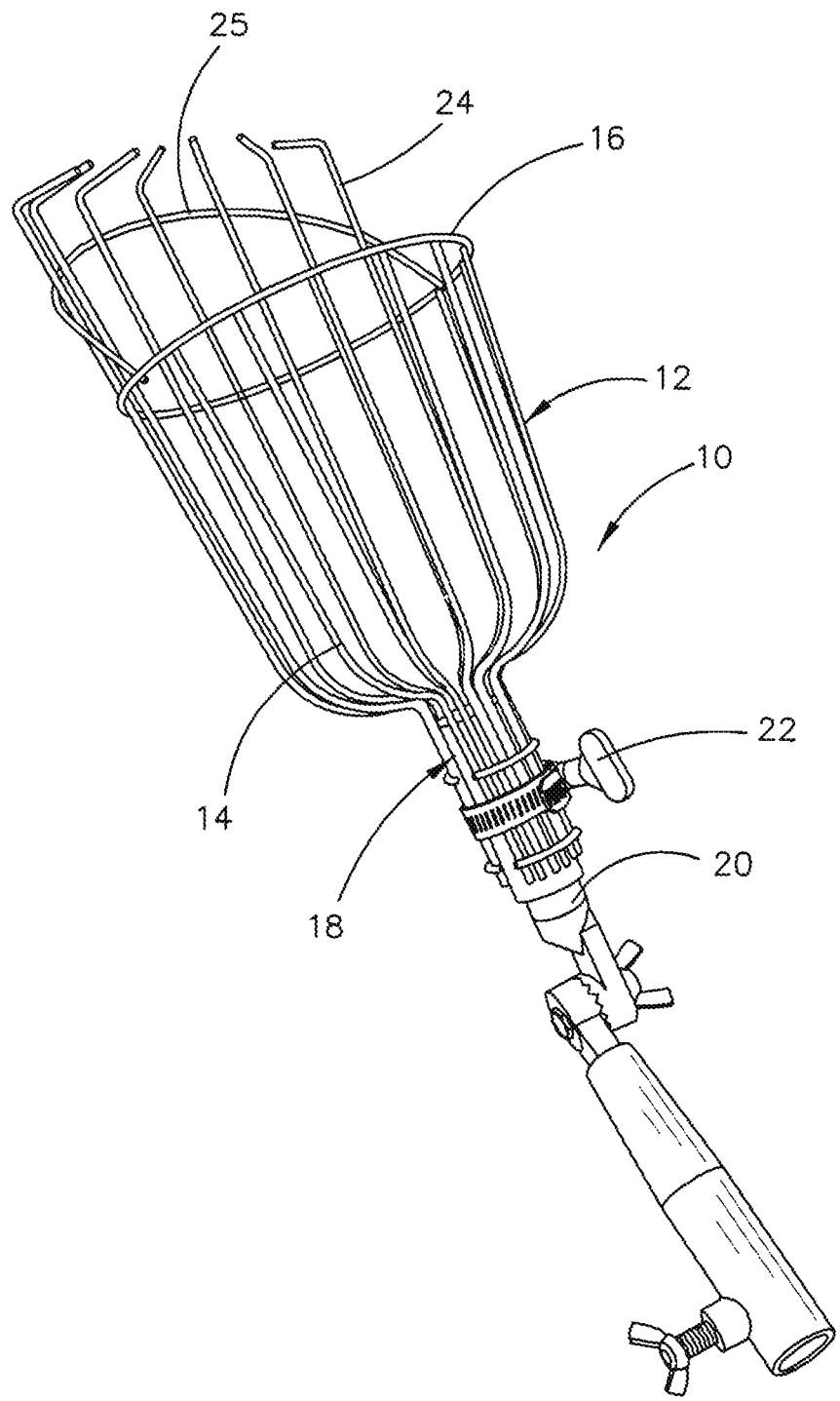
FIG. 1 is a perspective view of a typical prior art hand-held fruit picker of the basket type.
Figure 2:
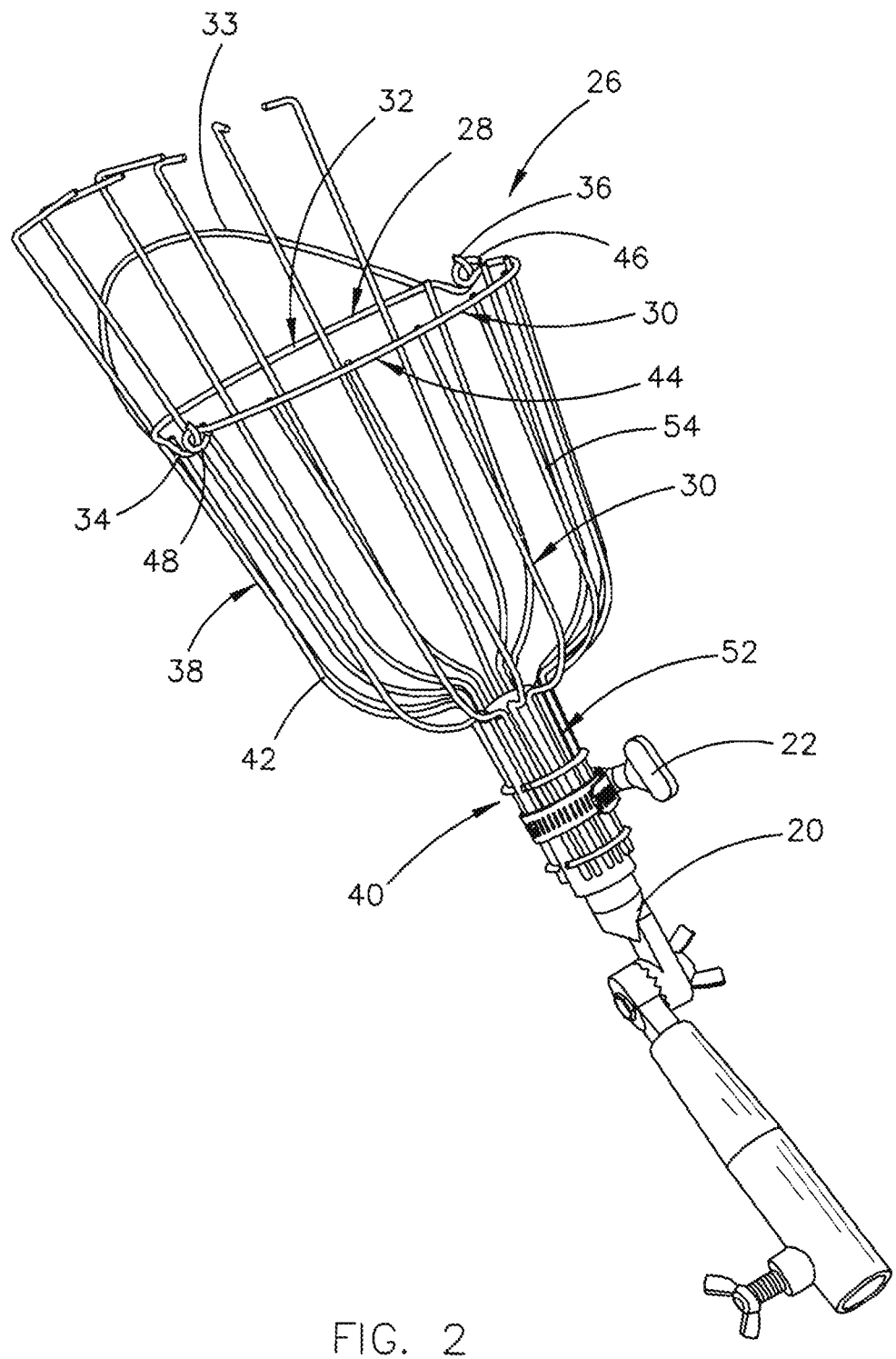
FIG. 2 is a perspective view of the fruit picker of this invention in its assembled working position.

The numeral 10 refers to a typical prior art fruit picker. Fruit picker 10 includes a basket 12 which is comprised of wire members 14 which are held in position by a circular wire ring 16. Fruit picker 12 also includes a lower end portion 18 which is split somewhat so that lower end portion 18 may be expanded somewhat to enable the upper end of a handle or pole 20 to be positioned therein and held therein by a conventional clamp 22. As seen in FIG. 1, the basket 12 has a plurality of elongated and bent fingers 24 which extend upwardly above ring 16 in conventional fashion. A U-shaped ring member 25 connects the wire ring 16 to some of the fingers 24 as seen in FIG. 1. Since the basket 12 of fruit picker 10 cannot be disassembled for shipment, only a limited number of fruit pickers 10 can be placed in a shipping container or on a pallet which dramatically increases shipment costs.

Figure 3:
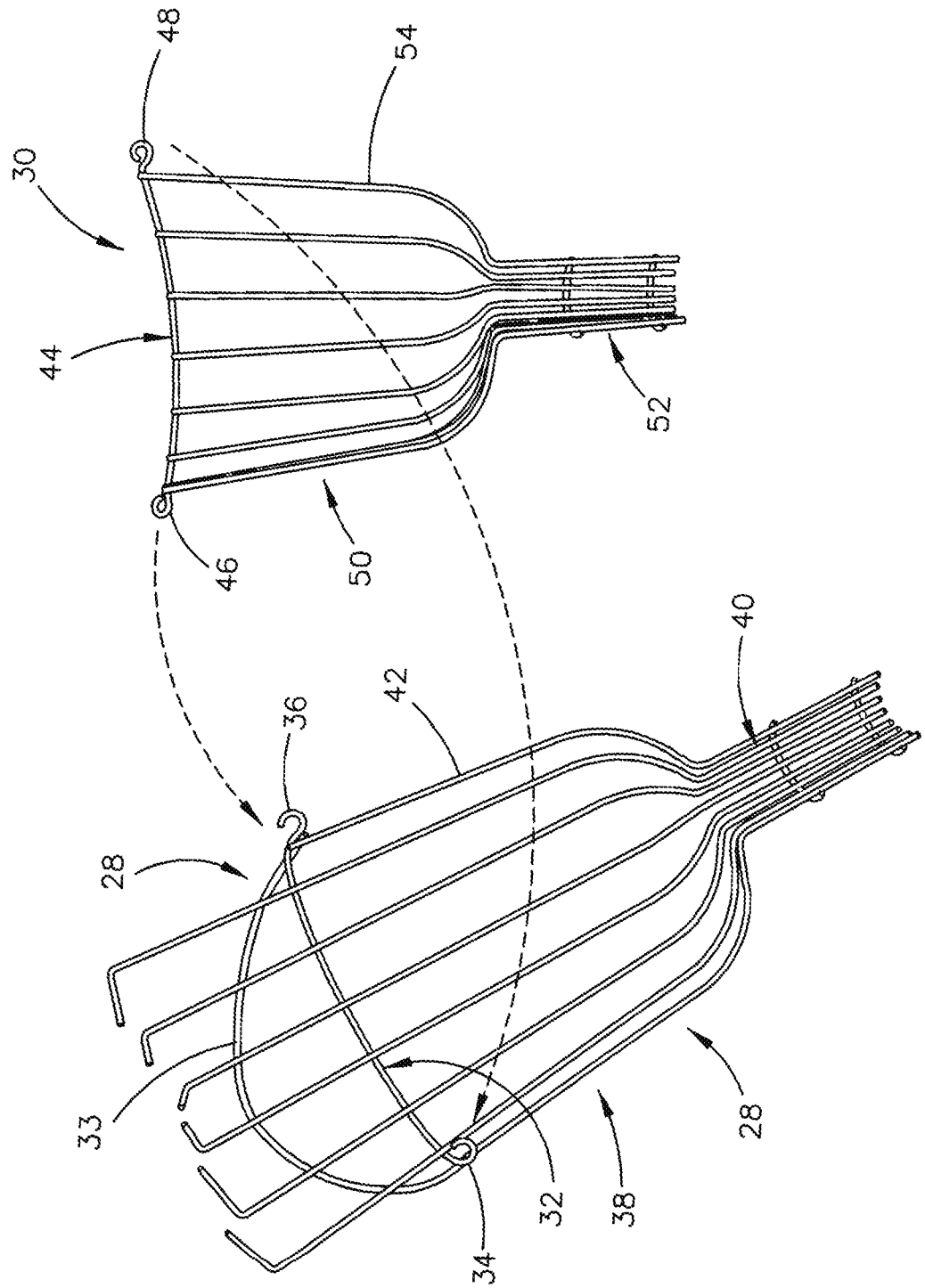
FIG. 3 is an exploded perspective view of the two basket portions of this invention about being joined together.
Figure 4:
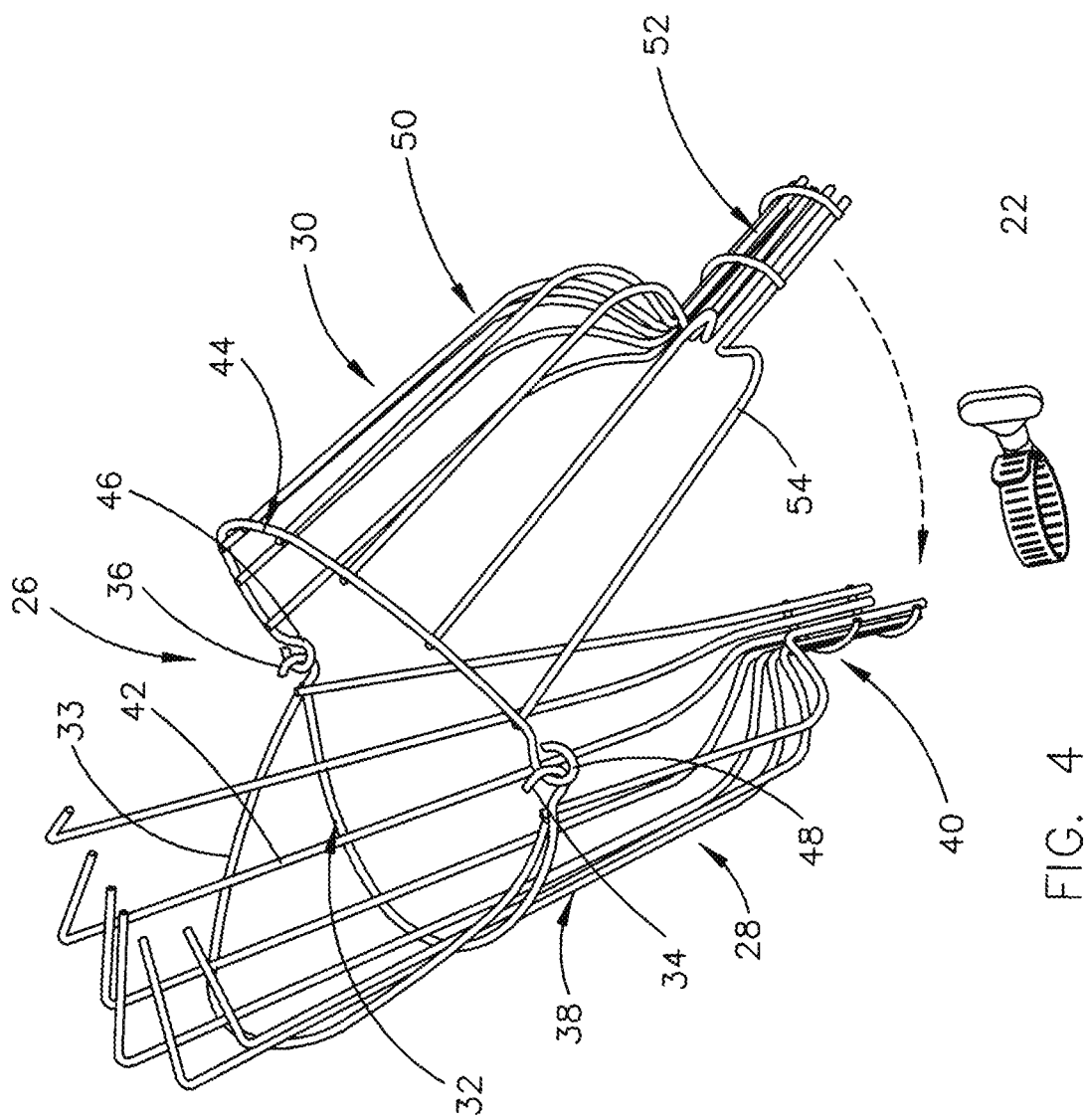
FIG. 4 is a further perspective view illustrating the second basket portion of this invention being attached to the first basket portion of this invention.
Figure 5:
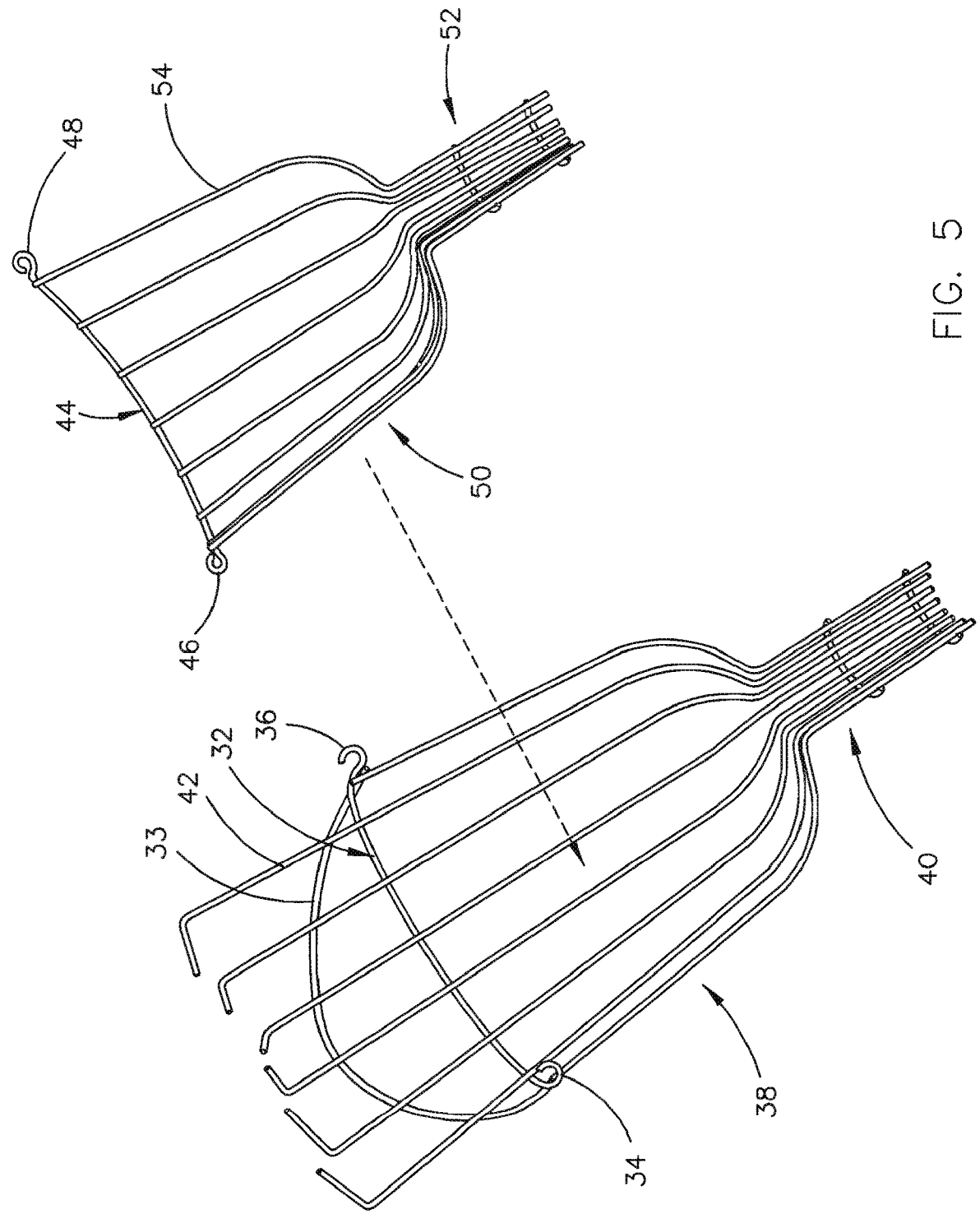
FIG. 5 is a perspective view illustrating the second basket portion about to be nested within the first basket portion.

The instant fruit picker invention is referred to by the reference numeral 26 and consists of basket portions 28 and 30 which are semi-circular in cross-section. Basket portion 28 includes a semi-circular support wire 32 having hook members 34 and 36 at the opposite ends thereof. Basket portion 28 also includes a U-shaped support wire 33 as seen in FIG. 3. Basket portion 28 includes a semi-circular upper body portion 38 and a semi-circular lower end portion 40. As seen, the basket portion 28 includes wire members 42. Basket portion 28 includes an inner side and an outer side.

Basket portion 30 is also semi-circular in configuration and includes a semi-circular support wire 44 having loop members 46 and 48 at the ends thereof. Basket portion 30 includes a semi-circular upper body portion 50 and a semi-circular lower end portion 52. Basket portion 30 includes an inner side and an outer side.

Figure 6:
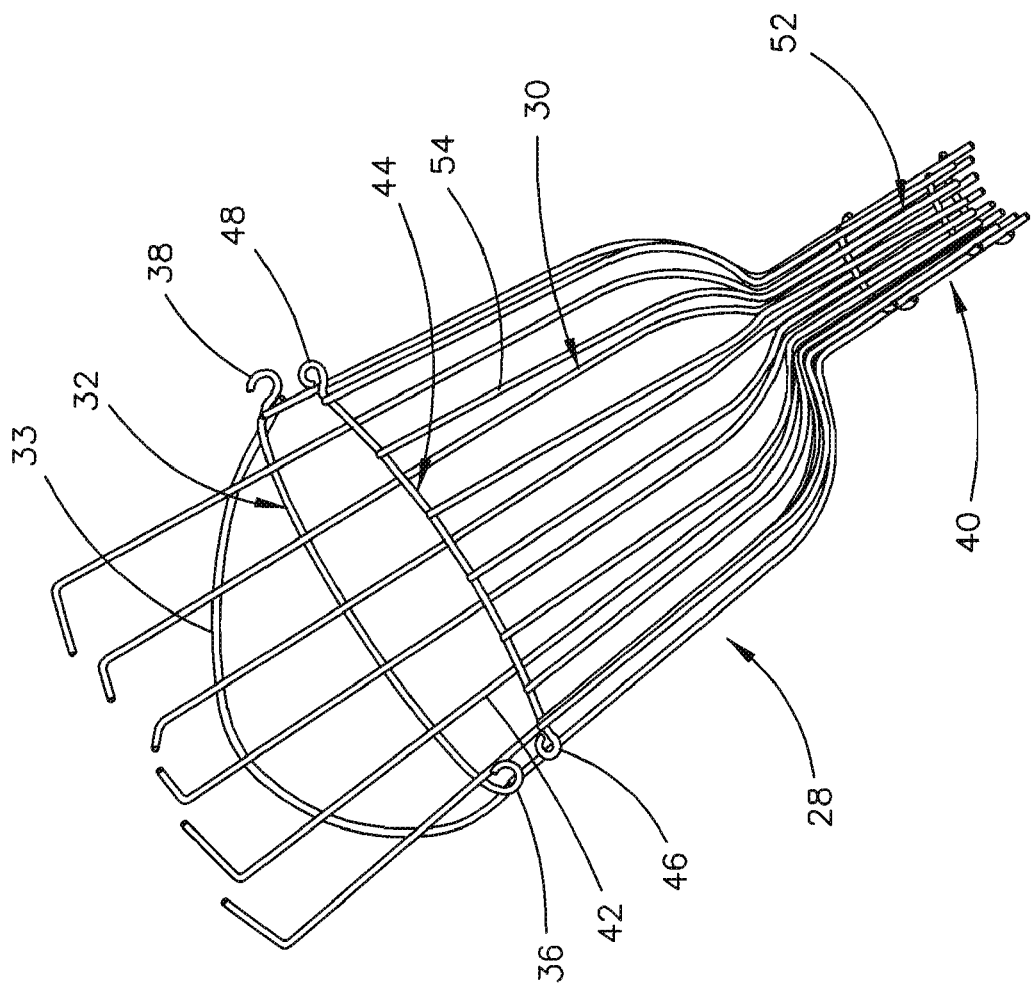
FIG. 6 is a perspective view illustrating the second basket portion being nested within the first basket portion.

When assembled, loop members 46 and 48 are connected to hook members 36 and 34 respectively to maintain the basket portions 28 and 30 together to form a basket similar to basket 12 of the prior art. The basket portions 28 and 30 will not be ordinarily connected together at the factory. For shipment or other purposes, basket portion 30 will be rotated with respect to basket portion 28 and basket portion 30 will be nested into basket portion 28 so that the outer side of basket portion 30 will be closely positioned to the inner side of basket portion 28 as seen in FIG. 6. The nested basket portions 28 and 30 occupy considerably less space than an assembled fruit picker which dramatically decreases the costs of shipment. The nested basket portions 28 and 30 are also smaller for storage, retailing, transportation, etc.

When it is desired to assemble the fruit picker 26, the basket portion 30 is removed from the inside side of basket portion 28 and rotated so that the loop member 46 may be connected to hook member 36 and so that loop member 48 may be connected to hook member 34. The clamp 22 is then extended around the lower end portions 40 and 52 to maintain the fruit picker 26 in the assembled position.

Thus it can be seen that the invention accomplishes at least all of its stated objectives.

Although the invention has been described in language that is specific to certain structures and methodological steps, it is to be understood that the invention defined in the appended claims is not necessarily limited to the specific structures and/or steps described. Rather, the specific aspects and steps are described as forms of implementing the claimed invention. Since many embodiments of the invention can be practiced without departing from the spirit and scope of the invention, the invention resides in the claims hereinafter appended.

We claim:

1. A fruit picker, comprising:
a first basket portion having an upper end, a lower end, an inner side and an outer side;
said first basket portion having a semi-circular configuration with first and second sides;
said first basket portion having a first hook member at said first side thereof below said upper end thereof;
said first basket portion having a second hook member at said second side thereof below said upper end thereof;
a second basket portion having an upper end, a lower end, an inner side and an outer side;
said second basket portion having a semi-circular configuration with first and second sides;
said second basket portion having a first loop member at said first side thereof at said upper end thereof;
said second basket portion having a second loop member at said second side thereof at said upper end thereof;
said second basket portion being selectively positioned in said first basket portion in a first position whereby said outer side of said second basket portion is positioned adjacent said inner side of said first basket portion for shipment purpose; and
said second basket portion being selectively positioned with respect to said first basket portion in a second position so that said second loop member of said second basket portion may be secured to said first hook member of said first basket portion and so that said first loop member of said second basket portion may be secured to said second hook member of said first basket portion to form a circular basket for picking fruit, wherein said first and second hook members are secured to the ends of a semi-circular support ring which is attached to said first basket portion and wherein said first and second loop members are secured to the ends of a semi-circular support ring which is attached to said upper end of said second basket portion.

2. The fruit picker of claim 1, wherein said lower ends of said first and second basket portions are shaped so as to be secured to a support pole.

* * * * *